United States Patent Office 3,238,613
Patented Mar. 8, 1966

3,238,613
METHOD OF JOINING METAL PARTS
Martinus Antonius Maria Bakker, Johannes Christiaan Duran, and Bauke Visser, Emmasingel, Eindhoven, Netherlands, assignors to North American Philips Company, Inc., New York, N.Y., a corporation of Delaware
No Drawing. Filed June 11, 1962, Ser. No. 201,337
Claims priority, application Netherlands, June 21, 1961, 266,232
3 Claims. (Cl. 29—498)

The invention relates to a method of joining metal parts and to articles the component parts of which are joined by this method.

When parts at least one of which includes a bushing through which at least one metal wire passes so as to be electrically insulated, for example a glass bushing subject to compressive stress or a bushing the material of which has a coefficient of expansion substantially equal to that of the metal in which it is disposed and which is joined to the said metal, are joined to one another in a gas- or vacuum-tight manner, the bushing is liable to be damaged.

Examples of articles of such structure are metal envelopes for transistors or thermionic valves. They comprise a base on which a transistor element or an electrode system is arranged and which includes glass bushings through which leads pass, and a metal hood or bulb which covers the element or system and the rim of which is joined to the base along the circumference thereof in a gas- or vacuum-tight manner.

Brazing has proved unsuitable for joining said parts. Owing to the high temperature the glass seal may melt and damage may be done to the electrode system by oxidation or to the semi-conductor crystal by diffusion. It has been found that the permanent vacuum-tight joint was not obtainable by soldering with the aid of alloys having a lower melting point. Welding also proved unsuitable since a glass seal cannot withstand abrupt temperature variations and an uneven supply of heat.

According to the invention the parts are joined in a gas- or vacuum-tight manner by first coating them with a layer mainly consisting of nickel with the aid of an electroless nickel-plating bath comprising an aqueous solution of nickel ions, hypophosphite ions and a compound forming a complex with nickel ions, the molar ratio between hypophosphite and nickel being at least about 3, the molar ratio between the compound forming complexes with nickel being at least 2, said bath having a pH-value of from 4 to 7, after which the nickel-plate parts are joined to one another by local application of heat. This local application of heat may take the form of resistance welding.

A method of joining parts is known comprising the steps of depositing a phosphorus-containing nickel layer on the parts from an electroless nickel-plating bath, bringing the parts into contact with one another and finally heating the assembly to a temperature of from 800° C. to 1400° C. in a protective atmosphere until the assembly contains substantially no more phosphorus.

The experiments leading to the method in accordance with the invention have shown that by combination of the application of a nickel layer from an electroless nickel-plating bath containing a compound forming complexes with nickel ions and of the local application of heat, for example by resistance welding, the parts are joined very satisfactorily without injury to the glass bushings. It was found that it is important that the heat supplied in the process of joining the parts is not largely absorbed by the metal of the parts. In contradistinction to a nickel layer obtained in a different manner, the nickel layer applied by the method described proved to have a particularly high electric resistivity and a low thermal conductivity as compared with the metal of which the parts are usually made, for example iron or steel.

It would appear that due to the presence of the nickel in the form of a complex the rate of the reduction to nickel metal is decreased while the decomposition of the hypophosphite with formation of phosphorus is substantially not influenced. The nickel separated from the solution has a considerably higher phosphorus content than nickel chemically deposited without the use of a complex former.

The amount of complex former to be added to the bath has to be chosen so that from 50% to 90% of the nickel ions in the bath are bound in the complex. This depends upon the dissociation constant of the nickel complex to be formed. Hence, the molecular ratio between the compound forming complexes with nickel and nickel has to be at least 2. The following table shows the phosphorus content in the deposited nickel on a series of plates as a function of the ratio of the amount of the complex former sodium citrate to the amount of nickel in a chemical nickel-plating bath.

Initially the bath contained 0.07 mole/1 Ni, added as $NiCl_2 \cdot 6H_2O$, 0.22 mole/1 sodium hypophosphite and 0.31 mole/1 sodium acetate +0.42 mole/1 acetic acid as buffer substance. The pH of the solution was 4.5+0.1 and the temperature of the bath 90° C.

The bath contained as a complex former sodium citrate.

Table

| Ratio, Gr. mol. Na-citrate: Gr. ions Ni++/1 | Percentage of the phosphorous in the nickel deposited |
|---|---|
| 0.60 | 9 |
| 0.77 | 10 |
| 0.91 | 11 |
| 1.06 | 12 |
| 1.23 | 13 |
| 2.86 | 14 |
| 3.22 | 15 |
| 3.84 | 16 |
| 5.55 | 18 |
| 8.34 | 20 |

Another complex former is, for example, hydroxyacetic acid. It was found that the nickel deposited in this manner exhibited the properties of high electric resistivity and low thermal conductivity which are important for the use described. This also is of advantage in resistance welding for the amount of welding energy required is reduced.

It should also be mentioned that the layer of nickel of high phosphorous content deposited for the purpose described is remarkably resistant to hydrogen peroxide, and this is important in manufacturing transistor envelopes. Before the envelopes are sealed, transistor elements have to be treated with hydrogen peroxide and many metals cannot withstand this treatment.

In a preferred embodiment of the invention, an acid-neutralizing complex former containing an amino group is used as the complex former in the chemical nickel-plating bath. Examples of such complex formers are ethylene diamine, ammonia or aminoacetic acid. By the use of these acid neutralizing complex formers, the pH-value is maintained substantially constant, whereas without this buffer action the pH-value would progressively decrease owing to the reaction:

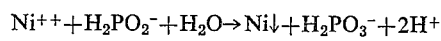

so that the deposition rate progressively decreases. The separate addition of a buffer is necessary in this case.

By adding an acid-neutralizing complex former for nickel ions to the nickel bath, the following reaction may be initiated, for example, by the addition of ethylenediamine:

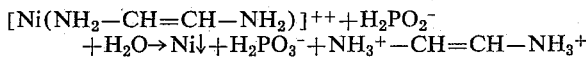

so that the pH-value of the solution is maintained substantially constant.

An example of another bath which may be used within the scope of the invention is a solution containing per litre 0.019 mole of $NiCl_2 \cdot 6H_2O$, 0.27 mole of aminoacetic acid, 0.06 mole of $NaH_2PO_2 \cdot 1H_2O$ and NaOH in an amount that the pH-value of this bath is 5.1. The nickel deposit on a plate, treated with this bath contained 14.5% phosphorus by weight.

It should be noted that a few compounds which may serve as complex formers have already been proposed as additions to electroless nickel-plating baths. A bath is known comprising an aqueous solution of nickel ions, hypophosphite ions and an aliphatic $\alpha$- or $\beta$-amino-carboxylic acid and/or a salt thereof, the molar ratio between nickel and hypophosphite being from 0.25 to 1.6, the molar ratio between aminocarboxylic acid and nickel being from 0.5 to 6.0 and the pH-value of the solution being from 4.5 to 9.0. In this known method, the aminocarboxylic acid is added to counteract the formation of black deposit owing to the occlusion of insoluble nickel phophite. The recognition that the addition of a complex former to the bath results in a nickel layer having a high electric resistivity and a low thermal conductivity with a view to joining parts including bushings sensitive to abrupt temperature variations by resistance welding, was not present in the known method.

The temperature of the nickel-plating bath preferably is made not higher than about 85° C., since otherwise nickel is also deposited upon the material of the bushing and has to be removed by a separate operation before the parts are joined. For a sufficiently high rate of separation of the nickel a minimum temperature of 65° C. is required.

To obtain a reproducible welding quality, it is important that the thickness of the layer of the nickel separated should be maintained constant at, say from 2 to 5 microns in accordance with the shapes of the parts to be welded. With a given surface area to be nickel-plated, this is obtained most readily by using a bath containing a calculated amount of nickel salt and nickel-plating until the bath is exhausted.

What is claimed is:

1. A method of joining metal parts to each other comprising treating said parts with an electroless nickel plating bath containing, in an aqueous solution, nickel ions, hypophosphite ions and a basic amino compound capable of forming complexes with the nickel ions, the molar ratio between the hypophosphite and nickel being at least about 3, the molar ratio of the amino compound to the nickel being at least 2 and the pH of the bath being from about 4 to 7 to thereby form a phosphorus containing nickel layer on said parts and then locally heating said parts to unite them at desired locations.

2. The method of claim 1 wherein the nickel plating bath is heated to a temperature between about 65° C. to 85° C. while in contact with the metal parts.

3. The method of claim 2 wherein resistance welding is employed to join the metal parts.

References Cited by the Examiner

UNITED STATES PATENTS

| | | | |
|---|---|---|---|
| 2,430,581 | 11/1947 | Pessel | 29—473.1 X |
| 2,532,283 | 12/1950 | Brenner et al. | |
| 2,795,040 | 6/1957 | Antel et al. | 29—504 X |
| 2,958,610 | 11/1960 | Ramirez et al. | 117—130 X |
| 2,993,810 | 7/1961 | Jensen et al. | 117—130 |
| 3,138,692 | 6/1964 | Bakker et al. | 117—130 X |
| 3,148,072 | 9/1964 | West et al. | 117—130 X |

FOREIGN PATENTS

| | | |
|---|---|---|
| 487,263 | 6/1938 | Great Britain. |
| 867,917 | 5/1961 | Great Britain. |

OTHER REFERENCES

Journal of Research of the National Bureau of Standards, vol. 39, November 1947, pp. 385–395.

Constitution of Binary Alloys, by Hansen, p. 1027, published in 1958 by McGraw-Hill Book Co., New York, N.Y.

JOHN F. CAMPBELL, *Primary Examiner.*